United States Patent [19]

Saruyama et al.

[11] Patent Number: 5,824,762
[45] Date of Patent: Oct. 20, 1998

[54] ORGANOPOLYSILOXANE AND METHOD FOR THE PREPARATION OF THE SAME

[75] Inventors: Toshio Saruyama; Makoto Yoshitake, both of Chiba Prefecture, Japan

[73] Assignee: Dow Corning Toray Silicone Co., Ltd., Tokyo, Japan

[21] Appl. No.: 760,892

[22] Filed: Dec. 6, 1996

Related U.S. Application Data

[63] Continuation-in-part of Ser. No. 345,155, Nov. 28, 1994, abandoned.

[51] Int. Cl.$^6$ ..................................................... C08G 77/04
[52] U.S. Cl. .................................. 528/26; 528/32; 528/39; 522/99; 428/447
[58] Field of Search .......................... 528/32, 26; 522/99; 428/447

[56] References Cited

U.S. PATENT DOCUMENTS

| 2,922,806 | 1/1960 | Merker | 260/448.2 |
|---|---|---|---|
| 4,293,678 | 10/1981 | Carter et al. | 528/32 |
| 4,558,082 | 12/1985 | Eckberg | 524/104 |
| 4,568,566 | 2/1986 | Tolentino | 427/54.1 |
| 4,777,233 | 10/1988 | Suzuki et al. | 528/32 |
| 4,908,274 | 3/1990 | Jachmann et al. | 428/452 |
| 4,963,438 | 10/1990 | Weitemeyer et al. | 428/447 |
| 4,978,726 | 12/1990 | Dohler et al. | 525/479 |
| 5,070,118 | 12/1991 | Exkberg | 522/99 |
| 5,391,405 | 2/1995 | Irifune et al. | 427/515 |

*Primary Examiner*—Margaret W. Glass
*Attorney, Agent, or Firm*—Arne R. Jarnholm

[57] ABSTRACT

A radiation-curable coating composition is formulated from a silicone resin that includes acrylate or methacrylate functional organic groups and phenyl groups.

5 Claims, No Drawings

ORGANOPOLYSILOXANE AND METHOD FOR THE PREPARATION OF THE SAME

This application is a continuation-in-part of Ser. No. 08/345,155, filed Nov. 28, 1990, now abandoned.

BACKGROUND OF THE INVENTION

1. Field of the Invention

The present invention relates generally to organopolysiloxanes. More specifically, the invention relates to a certain type of organopolysiloxanes that cure rapidly upon exposure to high-energy radiation, e.g., ultraviolet radiation, electron beam, and so forth, in the presence of a photopolymerization initiator to yield a highly heat-resistant product. The invention further relates to a method for the preparation of such certain organopolysiloxanes.

2. Description of the Prior Art

Organopolysiloxanes that contain trifunctional siloxane units exhibit excellent heat resistance and a capacity for film formation. For these reasons such organopolysiloxanes are used, inter alia, as electrical insulating materials, heat-resistant coatings, protective coatings, starting material for the preparation of copolymers with organic resin monomers, and agents for improving the physical properties of curable organic resins. Phenyl-containing branched organopolysiloxanes are particularly heat-resistant and as a result are used as insulating materials and paints for service in high-temperature environments where ordinary organic resins cannot he employed.

It is also known that (meth)acryloyl-functional organopolysiloxanes can be cured by exposure to high-energy radiation, such as ultraviolet light or an electron beam. Methods for the preparation of such organopolysiloxanes are also already known.

For example, Japanese Patent Application Laid Open [Kokai or Unexamined] Number Sho 56-86922 [86,922/1981] teaches the preparation of a (meth)acryloyl-functional organopolysiloxane by the reaction of an epoxy-functional organopolysiloxane with acrylic or methacrylic acid.

Japanese Patent Application Laid Open Number Sho 63-135426 [135,426/1988] also discloses a method for the preparation of an organopolysiloxane that is curable by high-energy radiation. This method consists of the successive reaction of an epoxy-functional organopolysiloxane first with acrylic or methacrylic acid and then with acryloyl or methacryloyl chloride.

Japanese Patent Application Laid Open Number Sho 63-196629 [196,629/1988] teaches the reaction of an epoxy-functional organopolysiloxane with a mixture of methacrylic acid and methacrylic anhydride.

However, the (meth)acryloyl-functional organopolysiloxanes afforded by the prior art exhibit poor curability and yield poorly heat-resistant cured products and are therefore excluded from use in some applications. The drawbacks of the prior art are overcome by the present invention. The novel radiation-curable organopolysiloxanes of the invention utilize trifunctional siloxane units and yield a cured coating that is highly heat-resistant.

In accordance with the present invention there is provided a novel organopolysiloxane having an average unit fomula $$(R^1SiO_{3/2})_a(R^2R^3SiO_{2/2})_b(SiO_{4/2})_c \quad (I)$$

wherein $R^1$, $R^2$, and $R^3$ denote organic groups selected from the group consisting of monovalent hydrocarbon groups, organic groups with the following general formula that contain acryloyl groups or methacryloyl groups

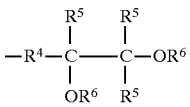

wherein $R^4$ denotes a divalent organic group, each $R^5$ independently denotes hydrogen or a monovalent organic group, and each $R^6$ denotes an acryloyl group or methacryloyl group or hydrogen atom and at least 1 of $R^6$ an acryloyl group or methacryloyl group, organic groups with the following general formula that contain the acryloyl group or methacryloyl group

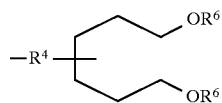

wherein $R^4$ and $R^6$ are defined as above, and epoxy-functional organic groups, wherein 5 to 30 mole % of said organic groups of formula (I) are organic groups that contain acryloyl or methacryloyl groups, 5 to 90 mole % of said organic groups of formula (I) are phenyl groups, 0.5 to 9 mole % of said organic groups of formula (I) are epoxy-functional groups; and a is a positive number, b is zero or a positive number, c is zero or a positive number, b/a is zero to 2, and c/(a+b+c) is zero to 0.3.

To explain the preceding in greater detail, the monovalent hydrocarbon groups subsumed under the definition for $R^1$, $R^2$, and $R^3$ in the preceding formula for the novel organopolysiloxane of the invention are exemplified by alkyl groups such as methyl, ethyl, propyl, and so forth; alkenyl groups such as vinyl, allyl, and so forth; and aryl groups such as phenyl and so forth. In regard to the other elements in the definition of $R^1$, $R^2$, and $R^3$, the group $R^4$ is a divalent organic group such as methylene, ethylene, propylene, 2-oxapropylene, 4-oxapropylene, the group with the structure

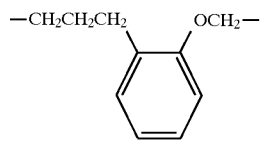

and so forth; $R^5$ is the hydrogen atom or a monovalent organic group such as methyl, ethyl, propyl, vinyl, phenyl, and naphthyl; and $R^6$ is the acryloyl group, methacryloyl group, or the hydrogen atom. Subject acryloyl-functional and methacryloyl-functional organic groups are specifically exemplified by the following.

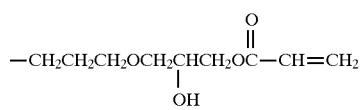

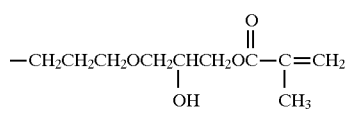

-continued

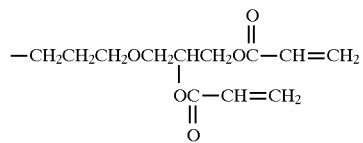
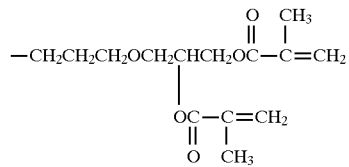
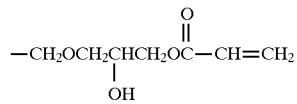
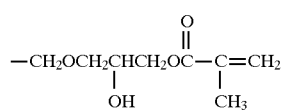
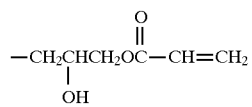
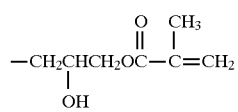
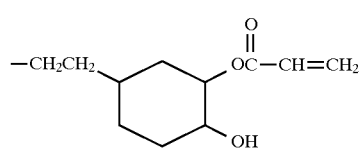
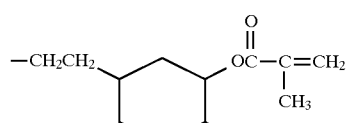
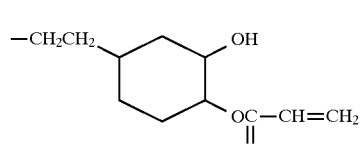
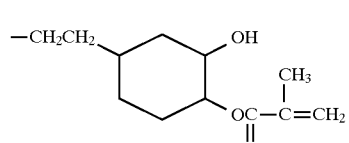
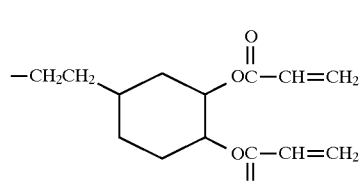

-continued

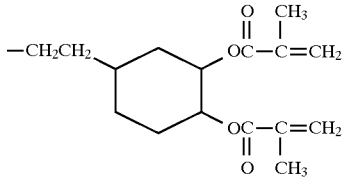
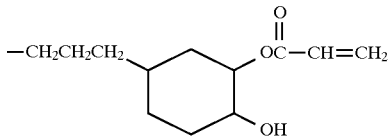
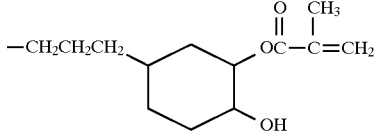

The epoxy-functional organic group is specifically exemplified by 2,3-epoxypropyl, 3,4-epoxybutyl, 3-glycidoxypropyl, 4-glycidoxybutyl, 2-(3,4-epoxycyclohexyl)ethyl, 3-(3,4-epoxycyclohexyl)propyl, 3-(2-glycidoxyphenyl)propyl, and so forth.

The organic groups containing acryloyl or methacryloyl must make up 5 to 30 mole % of the total organic groups in the organopolysiloxane of the invention as set forth in general formula (I). When the acrylol- or methylacrylol-containing organic groups are less than 5 mole %, the organopolysiloxane of formula (I) does not cure adequately when exposed to high-energy radiation, e.g., ultraviolet radiation, electron beam, etc. At the other extreme, the heat resistance of the organopolysiloxane of formula (I) declines at values in excess of 30 mole %. In addition, phenyl groups must comprise 5 to 90 mole % of the total organic groups in formula (I) The cure rate is slow and the cured product has a reduced heat resistance when the phenyl content is less than 5 mole %, while the post-cure film properties decline when the phenyl content exceeds 90 mole %.

The subscript a in the preceding formula (I) specifies the trifunctional siloxane unit content and is a positive number. The subscript b, which represents the difunctional siloxane unit content, has a value of zero or is a positive number, and the subscript c, which represents the tetrafunctional siloxane unit content, also has a value of zero or is a positive number. Furthermore, b/a should be a number from zero to 2, and c/(a+b+c) is to be a number from zero to 0.3. Values outside these ranges cause a reduced curability under exposure to high-energy radiation, e.g., ultraviolet radiation, electron beam, and so forth.

The method according to the invention for the preparation of subject organopolysiloxane characteristically comprises the reaction of (A) epoxy-functional organopolysiloxane with the general formula $$(R^7SiO_{3/2})_d(R^8R^9SiO_{2/2})_e(SiO_{4/2})_f$$

wherein $R^7$, $R^8$, and $R^9$ denote organic groups selected from the group consisting of monovalent hydrocarbon groups and epoxy-functional organic groups, and said epoxy-functional organic groups are 5 to 30 mole % of said organic groups, 5 to 90 mole % of said organic groups are phenyl groups, d is a positive number, e is zero or a positive number, f is zero or a positive number, e/d is zero to 2, and f/(d+e+f) is zero to 0.3 with (B) a sufficient quantity of acrylic acid or methacrylic acid, to cause 0.3 to 0.9 mole of this component to react with each mole of epoxy groups in component (A)

and, optionally (C) a sufficient quantity of an anhydride or acid halide of acrylic acid or methacrylic acid, to provide up to 1.0 mole of this component for each mole of epoxy groups in component (A).

$R^7$, $R^8$, and $R^9$ in the preceding formula for the component (A) used in the method of the invention denote organic groups selected from the group consisting of monovalent hydrocarbon groups and epoxy-functional organic groups. Said monovalent hydrocarbon groups are exemplified by the monovalent hydrocarbon groups provided above as exemplary of $R^1$, $R^2$, and $R^3$, and said epoxy-functional organic groups are exemplified by the epoxy-functional organic groups provided above for the organopolysiloxane of formula (I). The epoxy-functional organic groups must make up 5 to 30 mole % of the total organic groups, and 5 to 90 mole % of the total organic groups must be phenyl.

The subscript d in the preceding formula specifies the trifunctional siloxane unit content and is a positive number. The subscript e, which represents the difunctional siloxane unit content, has a value of zero or is a positive number, and the subscript f, which represents the tetrafunctional siloxane unit content, also has a value of zero or is a positive number. Furthermore, e/d should be a number from zero to 2, and f/(d+e+f) is to be a number from zero to 0.3.

The preparative method of the present invention comprises the reaction of the epoxy-functional organopolysiloxane (A) with acrylic acid or methacrylic acid comprising the aforesaid component (B), with a sufficient quantity of component (B) being added to the reaction so that 0.3 to 1.0 mole per each mole epoxy groups in component (A) is provided. The use of component (B) at less than 0.3 mole per each mole epoxy groups in component (A) results in too few acryloyl or methacryloyl groups the organopolysiloxane of formula (I), which in turn causes a poor curability. On the other hand, the reaction of more than 1.0 mole component (B) is essentially impossible, because the stoichiometry of this reaction permits the reaction of at most 1 mole carboxyl group per each mole epoxy group. The present inventors have found, however, that it is preferrable that only 0.9 moles of component (B) actually be reacted with each mole of epoxy groups. When all available epoxy groups are reacted, the product exhibits poor shelf stability. Hence, at least 10 mole percent of epoxy groups should remain unreacted.

The use of component (C), which is an anhydride or acid halide of acrylic or methacrylic acid, is optional. Component (C) is added in an amount up to 1.0 mole for each mole of epoxy groups in component (A) and is preferably added in an amount up to 0.5 mole for each of mole epoxy groups in component (A). The reaction of this component results in esterification of the alcoholic hydroxyl group generated by the reaction of the epoxy group in component (A) and the acrylic acid or methacrylic acid (B), and thereby functions to introduce a second acryloyl or methacryloyl group into an organic group already containing 1 acryloyl or methacryloyl group.

The reaction proceeds sequentially when component (C) is present in that components (A) and (B) react first and the resulting reaction product then reacts with component (C).

The reaction under consideration is run generally at 25° C. to 130° C. and is preferably run at 60° C. to 100° C. This reaction can be accelerated through the use of a catalyst, although it will run even in the absence of a catalyst. Suitable catalysts are, for example, acids such as paratoluenesulfonic acid, methanesulfonic acid, trifluoroacetic acid, and so forth, and amines such as triethylamine, benzyldimethylamine, 1,4-diazabicyclo[2.2.2]octane, tetramethylguanidine, and so forth.

The reaction of components (A) and (B) or (A), (B), and (C) may be run in the absence of organic solvent as long as the components can be mixed to homogeneity. However, it is generally preferred that the reaction be carried out in a solvent. Organic solvents suitable for this purpose are exemplified by aromatic hydrocarbon solvents such as toluene, xylene, and so forth, and aliphatic hydrocarbon solvents such as hexane, heptane, octane, and so forth.

The organopolysiloxanes of the present invention cure rapidly when exposed, in the presence of photopolymerization initiator, to high-energy radiation, e.g., ultraviolet radiation, electron beam, etc., to yield a highly heat-resistant product. These characteristics make the organopolysiloxane of the invention useful as a component in or physical-property improver for electrical insulating materials, heat-resistant paints, protective coatings, and so forth.

EXAMPLES

The invention is explained in greater detail below with reference to working examples. The Mn and Mw reported in the examples are the number-average molecular weight and weight-average molecule weight, respectively, of the organopolysiloxane as determined by gel permeation chromatography using polystyrene calibration. The following abbreviations are used: Me for methyl, Ph for phenyl, and Ep for 3-glycidoxypropyl.

EXAMPLE 1

199.2 g epoxy-functional organopolysiloxane (Mn=2,510, Mw=5,490) with the average component formula

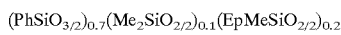

and 199.2 g toluene were placed in a reactor and mixed at room temperature to yield a homogeneous solution. 1.1 g tetramethylguanidine and 21.6 g acrylic acid were added with mixing to homogeneity. The resulting mixture was heated for 16 hours at 90° C. while stirring and then cooled. Removal of the toluene and unreacted acrylic acid by heating the reaction solution under reduced pressure gave 218.4 g of a viscous transparent yellow liquid. Mn for this product was 2,330, and Mw was 5,020. Using $^{29}$Si and $^{13}$C nuclear magnetic resonance spectroscopic analyses, this product was confirmed to be organopolysiloxane with the average component formula

in which

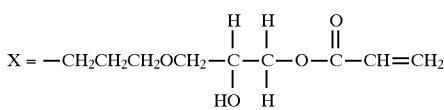

10 g of this organopolysiloxane was mixed to homogeneity with 0.4 g 2-hydroxy-2-methylpropiophenone (photopolymerization initiator, brand name: Darocur 1173, from Merck) and 10 g toluene. A test specimen was prepared by coating the obtained solution on an aluminum panel using a spin coater to give a dry film thickness of 4 to 6 micrometers. The toluene was evaporated off in a forced convection oven at 50° C., and the test specimen was then placed in a conveyor-type ultraviolet exposure device (UVC-2533 from the Ushio Denki Company). Ultraviolet exposure was conducted under the following conditions: lamp intensity=70 mW/cm, lamp height=100 mm, conveyor velocity=4 m/minute. The film surface was thereafter rubbed with a toluene-impregnated cloth in order to determine if the film would delaminate or dissolve. When delamination or dissolution of the film was observed, the test specimen was re-submitted to UV exposure in the conveyor-type ultraviolet exposure device. This procedure was used to determine the number of passes required until no film delamination or dissolution was observed. Another test specimen was submitted to thermogravimetric analysis in order to determine the weight loss of the cured film when heated. Heating was carried out in a nitrogen stream at a rate of rise of 15° C./minute. The temperature was measured at which the weight loss of the cured film reached 10 weight %, and this is reported as the 10% weight-loss temperature. The measurement results are reported in Table 1 below.

EXAMPLE 2

180.4 g epoxy-functional organopolysiloxane (Mn=2,780, Mw=6,830) with the average component formula

and 180.4 g toluene were placed in a reactor and mixed at room temperature to yield a homogeneous solution. 0.6 g 1,4-diazabicyclo[2.2.2]octane and 25.8 g methacrylic acid were added with mixing to homogeneity. The resulting mixture was heated for 24 hours at 90° C. while stirring and then cooled. Removal of the toluene and unreacted methacrylic acid by heating the reaction solution under reduced pressure gave 201.7 g of a viscous transparent yellow liquid. Mn for this product was 2,700, and Mw was 6,510. Using $^{29}$Si and $^{13}$C nuclear magnetic resonance spectroscopic analyses, this product was confirmed to be organopolysiloxane with the average component formula

in which

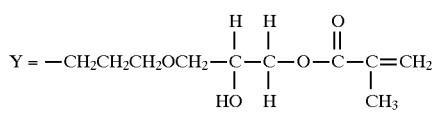

The properties of this organopolysiloxane were measured as in Example 1, and the obtained results are reported in Table 1 below.

EXAMPLE 3

132.9 g epoxy-functional organopolysiloxane (Mn=3,850, Mw=7,420) with the average component formula

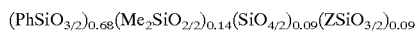

(Z=2-(3,4-epoxycyclohexyl)ethyl) and 66.4 g toluene were placed in a reactor and mixed at room temperature to yield a homogeneous solution. 7.73 g methacrylic acid and 17.0 g methacrylic anhydride were added with mixing to homogeneity. The resulting mixture was heated for 24 hours at 100° C. while stirring and then cooled. Removal of the toluene and unreacted methacrylic acid and methacrylic anhydride by heating the reaction solution under reduced pressure gave 145.0 g of a viscous transparent yellowish-brown liquid. Mn for this product was 3,710, and Mw was 6,940. Using $^{29}$Si and $^{13}$C nuclear magnetic resonance spectroscopic analyses, this product was confirmed to be organopolysiloxane with the average component formula

in which

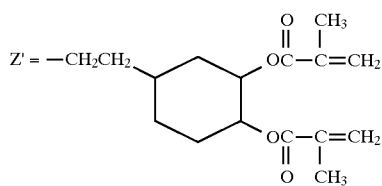

The properties of this organopolysiloxane were measured as in Example 1, and the obtained results are reported in Table 1 below.

COMPARATIVE EXAMPLE 1

83.8 g epoxy-functional organopolysiloxane with the average component formula

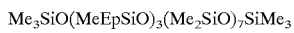

and 99.7 g toluene were placed in a reactor and mixed at room temperature to yield a homogeneous solution. 15.9 g acrylic acid and 0.50 g tetramethylguanidine were added with mixing to homogeneity. The resulting mixture was heated for 24 hours at 90° C. while stirring and then cooled. Removal of the toluene and unreacted acrylic acid by heating the reaction solution under reduced pressure gave 95.1 g of a viscous transparent yellowish-brown liquid. Using $^{29}$Si and $^{13}$C nuclear magnetic resonance spectroscopic analyses, this product was confirmed to be organopolysiloxane with the average component formula

in which X is defined as above.

The properties of this organopolysiloxane were measured as in Example 1, and the obtained results are reported in Table 1 below.

TABLE 1

|   | number of passes required for curing | 10% weiqht-loss temperature °C. |
|---|---|---|
| Example 1 | 2 | 370 |
| Example 2 | 3 | 360 |
| Example 3 | 2 | 360 |
| Comparative Example 1 | 11 | 280 |

What is claimed is:
1. A composition comprising an organopolysiloxane having an average unit formula

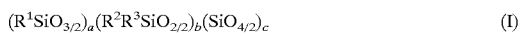

wherein $R^1$, $R^2$, and $R^3$ denote organic groups selected from the group consisting of monovalent hydrocarbon groups, organic groups of the following general formula that contain acryloyl groups or methacryloyl groups

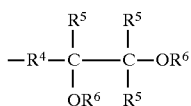

wherein R⁴ denotes a divalent organic group, each $R^5$ independently denotes hydrogen or a monovalent organic group, and each $R^6$ denotes an acryloyl group or methacryloyl group or hydrogen atom and at least 1 of $R^6$ is an acryloyl group or methacryloyl group, organic groups with the following general formula that contain the acryloyl group or methacryloyl group

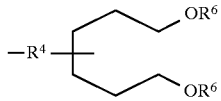

wherein $R^4$ and $R^6$ are defined as above, and epoxy-functional organic groups, wherein 5 to 30 mole % of said organic groups of formula (I) are groups that contain acryloyl or methacryloyl groups, 5 to 90 mole % of said organic groups of formula (I) are phenyl groups, 0.5 to 3 mole % of said organic groups are epoxy-functional organic groups and a is a positive number, b is zero or a positive number, c is zero or a positive number, b/a is zero to 2, and c/(a+b+c) is zero to 0.3.

2. A composition in accordance with claim 1 further comprising a photoinitiator.

3. A method for the preparation of an organopolysiloxane of the general formula (I) of claim 1, said method comprising reacting
   (A) an epoxy-functional organopolysiloxane having the general formula

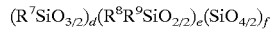

wherein $R^7$, $R^8$, and $R^9$ denote organic groups selected from the group consisting of monovalent hydrocarbon groups and epoxy-functional organic groups, and said epoxy-functional organic groups are 5 to 30 mole % of said organic groups, 5 to 90 mole % of said organic groups are phenyl groups, d is a positive number, e is zero or a positive number, f is zero or a positive number, e/d is zero to 2, and f/(d+e+f) is zero to 0.3)
with
   (B) a sufficient quantity of acrylic acid or methacrylic acid to cause 0.3 to 0.9 moles of acrylic acid or methacrylic acid to react with each mole of epoxy groups in component (A).

4. A method in accordance with claim 3 further comprising co-reacting about 0.5 mole of an anhydride or acid halide of acrylic acid or methacrylic acid for each mole of epoxy groups in component (A) during the reaction of components (A) and (B).

5. An article of manufacture comprising a substrate presenting at least one surface and said surface having a cured coating formed thereon, said cured coating being formed from the composition of claim 1.

* * * * *